US008548476B2

(12) United States Patent
Lei et al.

(10) Patent No.: US 8,548,476 B2
(45) Date of Patent: Oct. 1, 2013

(54) METHOD OF MANAGING X2 INTERFACE, HANDOVER METHOD, INTERFERENCE COORDINATION METHOD AND APPARATUS

(75) Inventors: Yixue Lei, Beijing (CN); Yongsheng Zhang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 93 days.

(21) Appl. No.: 13/275,853

(22) Filed: Oct. 18, 2011

(65) Prior Publication Data

US 2012/0100860 A1 Apr. 26, 2012

(30) Foreign Application Priority Data

Oct. 26, 2010 (CN) .......................... 2010 1 0526433
Jul. 4, 2011 (CN) .......................... 2011 1 0185914

(51) Int. Cl.
*H04W 36/00* (2009.01)

(52) U.S. Cl.
USPC .......... 455/438; 455/63.1; 455/444; 455/446; 455/436; 370/331; 370/338

(58) Field of Classification Search
USPC .......... 455/438, 432.1–436, 63.1, 424, 67.11; 370/328, 329, 331, 338
See application file for complete search history.

(56) References Cited

U.S. PATENT DOCUMENTS

| | | | |
|---|---|---|---|
| 8,260,206 B2* | 9/2012 | Damnjanovic .............. | 455/63.1 |
| 8,380,201 B2* | 2/2013 | Takahashi et al. ........... | 455/436 |
| 8,423,008 B2* | 4/2013 | Pedersen et al. ............. | 455/418 |
| 8,433,249 B2* | 4/2013 | Krishnamurthy et al. ... | 455/63.1 |
| 2009/0156208 A1* | 6/2009 | Vesterinen et al. ......... | 455/435.1 |
| 2010/0008293 A1* | 1/2010 | Gupta et al. ................. | 370/328 |
| 2011/0013560 A1* | 1/2011 | Zhang et al. ................. | 370/328 |
| 2011/0044269 A1* | 2/2011 | Fan et al. ..................... | 370/329 |
| 2011/0250892 A1* | 10/2011 | Gupta et al. ................. | 455/437 |
| 2011/0269465 A1* | 11/2011 | Xu et al. ...................... | 455/436 |
| 2012/0069756 A1* | 3/2012 | Ji et al. ........................ | 370/252 |
| 2012/0083280 A1* | 4/2012 | Liu et al. ..................... | 455/446 |
| 2012/0150998 A1* | 6/2012 | Wang ........................... | 709/217 |
| 2013/0005330 A1* | 1/2013 | Han et al. .................... | 455/424 |

* cited by examiner

*Primary Examiner* — Sharad Rampuria
(74) *Attorney, Agent, or Firm* — Harness, Dickey & Pierce, PLC (57) ABSTRACT

Disclosed is a method of managing an X2 interface, a handover method, an interference coordination method and an apparatus for LTE and LTE-Advanced system. X2 interface management includes: finding by a first eNB, a new neighboring cell, i.e., a second cell corresponding to a second HeNB; determining by the first eNB, an access mode of the second cell; and establishing a first X2 interface between the first eNB and the second HeNB when the access mode of the second cell is an open mode or a hybrid mode. The X2 interface may be managed dynamically and the mode for establishing the X2 interface, such as direct X2 interface or gateway-proxied X2interface, may be selected. The expansible problem and system overhead due to the X2interface in the LTE and LTE-Advanced system may be reduced effectively to better support handover and interference coordination.

19 Claims, 7 Drawing Sheets

--Prior Art--

METHOD OF MANAGING X2 INTERFACE, HANDOVER METHOD, INTERFERENCE COORDINATION METHOD AND APPARATUS

BACKGROUND OF THE INVENTION

1. Field of the Invention

This disclosure relates to a long term evolution (LTE) system and a long term evolution advanced (LTE-Advanced) system in a mobile communication field, and more particularly to a method of managing an X2 interface between eNBs, a handover method, an interference coordination method, an eNB and a system for handing over a user equipment (UE) in the LTE system or the LTE-Advanced system.

2. Description of the Prior Art

Figure 1:
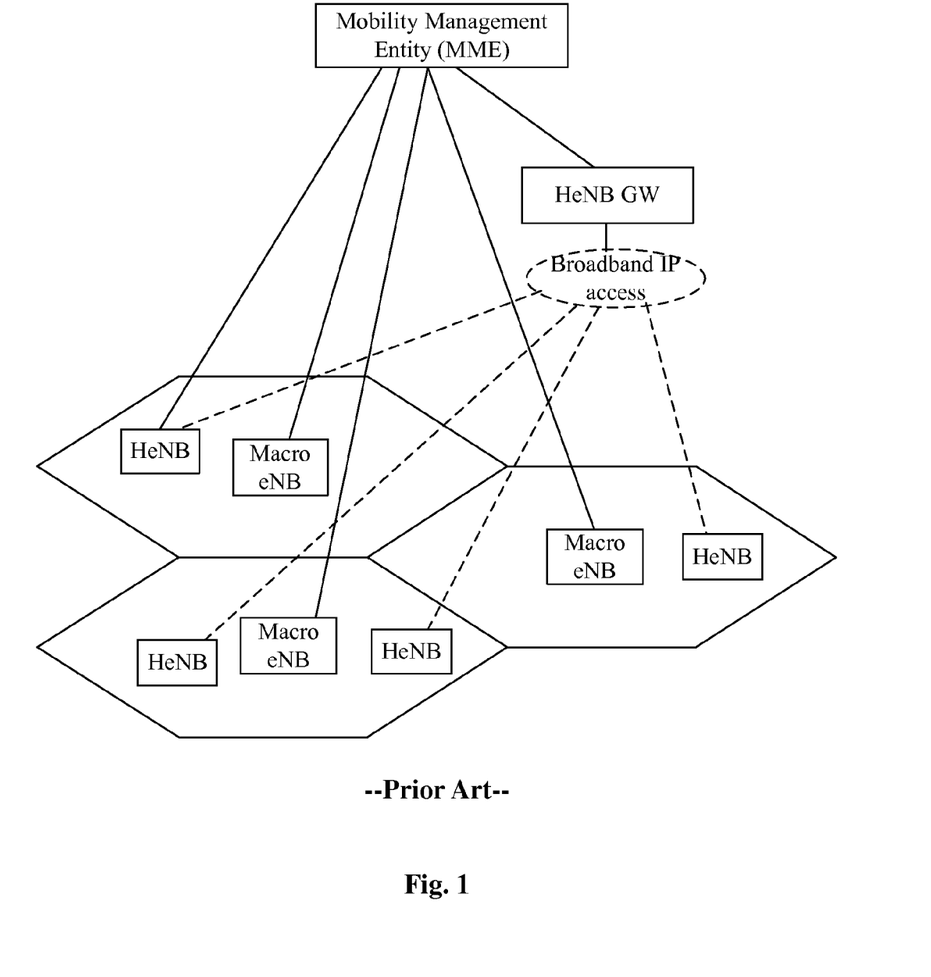
FIG. 1 is a schematic diagram showing a configuration of a conventional LTE network.

3GPP LTE system has a good prospective. The system originated from a conventional Universal Mobile Telecommunications System (UMTS), which may provide a higher wireless access rate and a better service support. FIG. 1 is a schematic diagram showing a configuration of a LTE network. The LET network includes a Mobility Management Entity (MME) and an evolved wireless access network node (eNode B, simplified as eNB), and the eNB includes a macro eNB and a HeNB (home eNode B). The macro eNB in FIG. 1 is connected to the MME through an S1 interface. The HeNB may be connected to the MME directly and may be connected to the MME through a HeNB gateway (HeNB GW).

Usually there are three access modes for the HeNB, including an open mode, a closed mode and a hybrid mode. A closed subscriber group (CSG) is used in the closed mode. According to an admission control adopting the CSG, only a certain user equipment (UE) may access a corresponding HeNB. In the open mode, all subscribers may access the HeNB and the network will not discriminate whether the subscriber is a CSG subscriber allowed by the HeNB. In the closed mode, only a subscribers belonging to the CSG allowed by the HeNB may access the HeNB. In the hybrid mode, all the subscribers may access the HeNB but the network may discriminate whether the subscriber is the CSG subscriber allowed by the HeNB in order to perform a necessary priority control. The priority control may include a wireless resource acceptance control or a QoS control.

Figure 2:
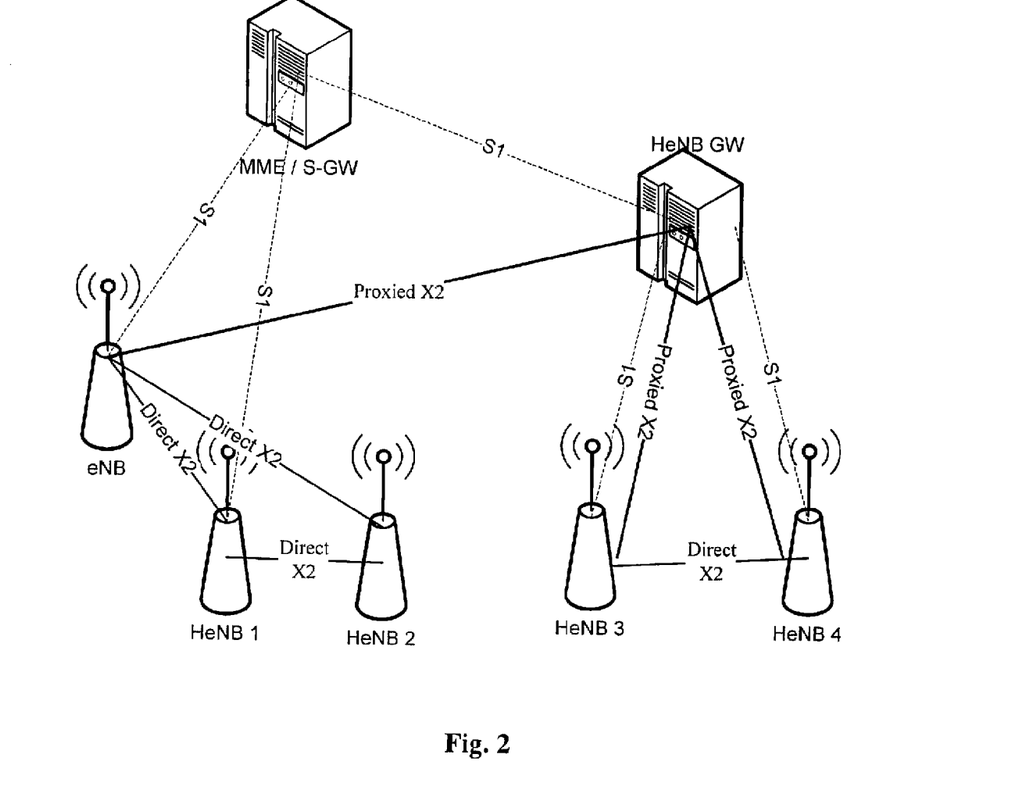
FIG. 2 is a schematic diagram showing a S1 interface, a direct X2 interface and a gateway proxied X2 interface.

Referring to FIG. 2, the S1 interface is between the Mobility Management Entity/Serving Gateway (MME/S-GW) and the eNB, and an X2 interface is between the eNBs. The S1 interface or the X2 interface in this description refers to an S1 interface connection or an X2 interface connection.

Currently, there does not exist a detailed solution to dynamically manage the HeNB X2 interface.

SUMMARY OF THE INVENTION

Problems to be solved by embodiments of the invention is to provide a method of managing an X2 interface, a handover method, an interference coordination method, an eNB and a system for handing over a user equipment, thus dynamically managing the X2 interface of the HeNB.

Based on the above X2 interface, embodiments of the invention further provide a handover method and a system for handing over a user equipment, thus controlling a handover of the user equipment by using the X2 interface.

In order to solve the above problems, embodiments of the invention provide the following solutions.

In according to an embodiment of the present invention, there is a method of managing an X2 interface. The method includes: finding by a first eNB, a new neighboring cell, which is a second cell corresponding to a second HeNB; determining by the first eNB, an access mode of the second cell; and establishing a first X2 interface between the first eNB and the second HeNB when the access mode of the second cell is an open mode or a hybrid mode.

Preferably, the method further includes: determining whether the first eNB and the second HeNB are configured with a same closed subscriber group identifier when the access mode of the second cell is a closed mode; and establishing the first X2 interface between the first eNB and the second HeNB when the first eNB and the second HeNB are configured with the same closed subscriber group identifier.

Preferably, the method further includes: establishing the first X2 interface between the first eNB and the second HeNB upon detecting that a certain user equipment is approaching the second cell when the first eNB and the second HeNB are not configured with the same closed subscriber group identifier, wherein the certain user equipment refers to a user equipment residing in a first cell corresponding to the first eNB and having access to the first cell and the second cell, approaching the second cell refers to there is a possibility that the certain user equipment enters the second cell within a predetermined period or a distance between the certain user equipment and a coverage border of the second cell is less than a predetermined distance.

Preferably, the method further includes: establishing the first X2 interface between the first eNB and the second HeNB upon detecting that interference between the first cell corresponding to the first eNB and the second cell exceeds a predetermined threshold for a predetermined first period when the first eNB and the second HeNB are not configured with the same closed subscriber group identifier, wherein the first X2 interface is configured to transmit interference coordination information between cells.

Preferably, establishing the first X2 interface between the first eNB and the second HeNB includes: determining whether the second HeNB is connected with a mobility management entity through a HeNB gateway when the first eNB is a macro eNB, if yes, establishing a gateway proxied X2 interface between the first eNB and the second HeNB, and if no, establishing a direct X2 interface between the first eNB and the second HeNB; and determining whether the first eNB and the second HeNB are connected with a same mobility management entity or a same HeNB gateway when the first eNB is a HeNB, if yes, establishing a direct X2 interface between the first eNB and the second HeNB, and if no, establishing a gateway proxied X2 interface between the first eNB and the second HeNB.

Preferably, the method further includes: determining by the first eNB whether a condition for releasing the first X2 interface is satisfied, and if yes, releasing the first X2 interface between the first eNB and the second HeNB, wherein the condition for releasing the first X2 interface includes at least one of the following conditions: the second cell corresponding to the second HeNB has been deleted from neighboring cells of the first eNB; it is detected that all the certain user equipments have left the second cell☐ a handover frequency between the first eNB and the second HeNB through the X2 interface is lower than a predetermined second threshold; and interference between the first eNB and the second HeNB does not exceed the predetermined threshold for a predetermined second period.

Preferably, when the first X2 interface is a direct X2 interface, releasing the first X2 interface between the first eNB and the second HeNB includes releasing a context of the first X2 interface at the first eNB and the second HeNB respectively; and when the first X2 interface is a gateway proxied X2 interface, releasing the first X2 interface between the first eNB and the second HeNB includes releasing a context of a first segment and releasing a context related to the first X2 interface in a second segment, wherein the first segment is a segment of the first X2 interface between the second HeNB and a HeNB gateway and the second segment is a segment of the first X2 interface between the first eNB and the HeNB gateway.

Preferably, the method further includes: determining whether a handover frequency between the first eNB and the second HeNB through an S1 interface is higher than a predetermined first threshold when an X2 interface is not established between the first eNB and the second HeNB; and if yes, establishing the first X2 interface between the first eNB and the second HeNB.

An embodiment of the invention provides a handover method used in the first X2 interface established by the method of managing the X2 interface, including: sending a handover request for a user equipment to a second HeNB from a first eNB, wherein the first eNB is a source eNB and the second HeNB is a target eNB; sending an access control request to a core network node by the second HeNB after the second HeNB receives the handover request; returning an access control response to the second HeNB by the core network node based on contract information of the user equipment; returning a handover request acknowledge indicating whether the user equipment is allowed to be handed over to the first eNB through the first X2 interface based on the access control response by the second HeNB; and sending a handover command to the user equipment by the first eNB so as to control the user equipment to be handed over to a second cell corresponding to the second HeNB when the handover request acknowledge indicates that the user equipment is allowed to be handed over.

An embodiment of the invention provides a handover method used in the first X2 interface established by the method of managing the X2 interface, including: sending an access control request for a user equipment to a core network node by a first eNB, wherein the first eNB is a source eNB and the access control request is for requesting the user equipment to be handed over from a first cell corresponding to the first eNB to a second cell corresponding to the second HeNB; returning an access control response to the first eNB by the core network node based on contract information of the user equipment; sending a handover request for the user equipment to the second HeNB through the first X2 interface from the first eNB if the access control response indicates that the user equipment is allowed to be handed over; returning a switch response indicating that the user equipment is allowed to be handed over to the first eNB by the second HeNB through the first X2 interface after the second HeNB receives the handover request; and sending a handover command to the user equipment by the first eNB to control the user equipment to be handed over to a cell corresponding to the second HeNB after the first eNB receives the handover request acknowledge.

An embodiment of the invention provides interference coordination method, including: finding by a first eNB, a new neighboring cell, which is a second cell corresponding to a second HeNB; determining by the first eNB, an access mode of the second cell; determining whether the first eNB and the second HeNB are configured with a same closed subscriber group identifier when the access mode of the second cell is a closed mode; if no, establishing a first X2 interface between the first eNB and the second HeNB upon detecting that interference between the first cell corresponding to the first eNB and the second cell exceeds a predetermined threshold for a predetermined first period; and transmitting interference coordination information between cells through the first X2 interface and performing interference coordination based on the interference coordination information.

Preferably, the interference coordination information includes the interference coordination information includes carrier frequency points, overload indications and high interference indications of different carriers.

Preferably, the interference coordination method further includes: checking an available bandwidth of the first X2 interface; and adjusting an interacting frequency of the interference coordination information dynamically based on the available bandwidth.

An embodiment of the invention provides a first eNB, including: a finding unit, configured to find a new neighboring cell of the first eNB, wherein the new neighboring cell is a second cell corresponding to a second HeNB; a first determining unit, configured to determine an access mode of the second cell; and a establishing unit, configured to establish a first X2 interface between the first eNB and the second HeNB when the access mode of the second cell is an open mode or a hybrid mode.

Preferably, the first eNB further includes: a second determining unit, configured to determine whether the first eNB and the second HeNB are configured with a same closed subscriber group identifier when the access mode of the second cell is a closed mode, wherein the establishing unit is further configured to establish the first X2 interface between the first eNB and the second HeNB when the first eNB and the second HeNB are configured with the same closed subscriber group identifier.

Preferably, the first eNB further includes: a first detecting unit, configured to detect whether a certain user equipment is approaching the second cell, wherein the certain user equipment refers to a user equipment residing in a first cell corresponding to the first eNB and having access to the first cell and the second cell, approaching the second cell refers to there is a possibility that the certain user equipment enters the second cell within a predetermined period or a distance between the certain user equipment and a coverage border of the second cell is less than a predetermined distance, wherein the establishing unit is further configured to establish the first X2 interface between the first eNB and the second HeNB if the first detecting unit detects the certain user equipment is approaching the second cell when the first eNB and the second HeNB are not configured with the same closed subscriber group identifier.

Preferably, the first eNB further includes: a second detecting unit, configured to detect interference between the first cell corresponding to the first eNB and the second cell and to determine whether the interference exceeds a predetermined threshold for a predetermined first period, wherein the establishing unit is further configured to establish the first X2 interface between the first eNB and the second HeNB if the second detecting unit detects the interference exceeds the predetermined threshold for the predetermined first period when the first eNB and the second HeNB are not configured with the same closed subscriber group identifier.

Preferably, the establishing unit includes: a first processing unit, configured to determine whether the second HeNB is connected with a mobility management entity through a HeNB gateway when the first eNB is a macro eNB, if yes, to establish a gateway proxied X2 interface between the first eNB and the second HeNB, and if no, to establish a direct X2 interface between the first eNB and the second HeNB; and a second processing unit, configured to determine whether the first eNB and the second HeNB are connected with a same mobility management entity or a same HeNB gateway when the first eNB is a HeNB, if yes, to establish a direct X2 interface between the first eNB and the second HeNB, and if no, to establish a gateway proxied X2 interface between the first eNB and the second HeNB.

Preferably, the first eNB further includes: a third determining unit, configured to determine whether a condition for releasing the first X2 interface is satisfied, wherein the first X2 interface is established between the first eNB and the second HeNB; a releasing unit, configured to release the first X2 interface between the first eNB and the second HeNB when the third determining unit determines that the condition for releasing the first X2 interface is satisfied, wherein the condition for releasing the first X2 interface includes at least one of the following conditions: the second cell corresponding to the second HeNB has been deleted from neighboring cells of the first eNB; it is detected that all the certain user equipments have left the second cell☐ a handover frequency between the first eNB and the second HeNB through the X2 interface is lower than a predetermined second threshold; and interference between the first eNB and the second HeNB does not exceed the predetermined threshold for a predetermined second period.

Preferably, the releasing unit includes: a third processing unit, configured to release a context of the first X2 interface at the first eNB and the second HeNB respectively when the first X2 interface is a direct X2 interface; and a fourth processing unit, configured to release a context of a first segment and releasing a context related to the first X2 interface in a second segment when the first X2 interface is a gateway proxied X2 interface, wherein the first segment is a segment of the first X2 interface between the second HeNB and a HeNB gateway and the second segment is a segment of the first X2 interface between the first eNB and the HeNB gateway.

Preferably, the first eNB further includes: a fourth determining unit, configured to determine whether a handover frequency between the first eNB and the second HeNB through an S1 interface is higher than a predetermined first threshold when an X2 interface is not established between the first eNB and the second HeNB, wherein the establishing unit is further configured to establish the first X2 interface between the first eNB and the second HeNB when the handover frequency through an S1 interface is higher than the predetermined first threshold.

An embodiment of the invention provides a system for handing over a user equipment, the system includes the first eNB, a second HeNB and a core network node, and a first X2 interface established between the first eNB and the second HeNB, wherein the first eNB sends a handover request for a user equipment to the second HeNB, wherein the first eNB is a source eNB and the second HeNB is a target eNB; the second HeNB sends an access control request to a core network node after receiving the handover request; the core network node returns an access control response to the second HeNB based on contract information of the user equipment; the second HeNB returns a handover request acknowledge indicating whether the user equipment is allowed to be handed over to the first eNB through the first X2 interface based on the access control response; and when the handover request acknowledge indicating that the user equipment is allowed to be handed over, the first eNB sends a handover command to the user equipment so as to control the user equipment to be handed over to a cell corresponding to the second HeNB.

An embodiment of the invention provides a system for handing over a user equipment, the system includes the first eNB, a second HeNB and a core network node, and a first X2 interface established between the first eNB and the second HeNB, wherein the first eNB sends an access control request for a user equipment to the core network node, wherein the first eNB is a source eNB and the access control request is for requesting the user equipment to be handed over from a cell corresponding to the first eNB to a cell corresponding to the second HeNB; the core network node returns an access control response to the first eNB based on contract information of the user equipment; the first eNB sends a handover request for the user equipment to the second HeNB through the first X2 interface if the access control response indicates that the user equipment is allowed to be handed over; the second HeNB returns a switch response indicating that the user equipment is allowed to be handed over to the first eNB through the first X2 interface after receiving the handover request; and the first eNB sends a handover command to the user equipment to control the user equipment to be handed over to the cell corresponding to the second HeNB after receiving the handover request acknowledge.

An embodiment of the invention provides a system for interference coordination, including the first eNB, a second HeNB and a core network node, and a first X2 interface established between the first eNB and the second HeNB, wherein the first eNB and the second HeNB transmit interference coordination information through the first X2 interface and perform interference coordination based on the interference coordination information.

According to the method of managing the X2 interface, the handover method, the interference coordination method, the eNB and the system according to embodiments of the invention, the X2 interface may be managed dynamically and a specific mode for establishing the X2 interface may be selected, such as a direct X2 interface or a gateway proxied X2 interface. In the LET and the LTE-Advanced system according to embodiments of the invention may effectively reduce an expasible problem and a system overhead due to the X2 interface so as to better support handover and interference coordination. Based on the X2 interface established according to the embodiment of the invention, an embodiment of the invention further realizes controlling the handover of the user equipment and adjusting a transmitting frequency of the interference suppression information based on the bandwidth of the X2 interface.

Additional aspects and advantages of the embodiments of the present disclosure will be given in part in the following descriptions, become apparent in part from the following descriptions, or be learned from the practice of the embodiments of the present disclosure.

DETAILED DESCRIPTION OF THE PREFERRED EMBODIMENTS

Referring to FIG. 2, in an embodiment of the invention, an X2 interface may be a direct X2 interface or a gateway proxied X2 interface. These two X2 interfaces may exist between a macro eNB and a HeNB or between HeNBs.

The direct X2 interface is a Stream Control Transmission Protocol (SCTP) connection between a source eNB and a target HeNB established by the source eNB after the source eNB knows a transmission network layer address (IP address) of the HeNB. When the X2 interface is established, a message from the source eNB to the target HeNB carries a destination address, which is the transmission network layer address of the target HeNB. If the X2 message to the target HeNB passes a HeNB GW, the HeNB GW is transparent to the X2 message, namely, the HeNB GW only transparently forwards the X2 message. In such manner, since the HeNB only forwards the X2 message transparently, it is unnecessary for the HeNB GW to maintain related transfer information; however, it causes more X2 interfaces exist between eNBs. The source eNB includes a source macro eNB or a source HeNB.

The gateway proxied X2 interface refers to an X2 interface between a source eNB and a target HeNB, which is proxied by a HeNG GW. The source eNB does not need to know the transmission network layer address (IP address) of the target HeNB and only one SCTP connection is established between the source eNB and the target HeNB. The HeNB GW functions as a proxy to establish the SCTP connection to the target HeNB so as to carry the X2 interface. In this case, when the HeNB GW forwards the X2 message, the message needs to be proxied, which means the source address or the destination address needs to be modified. In such manner, an amount of X2 interfaces decreases; however, the HeNB GW needs to maintain more forward item information and to make complex proxying processing, such as modifying the source address and the destination address of the message.

According to an embodiment of the invention, a method of managing the X2 interface is provided, for dynamically establishing and releasing the X2 interface between eNBs. Further, a handover method, an eNB and a system for handing over a user equipment (UE) are provided, for effectively reducing an expansible problem and a system overhead due to the X2 interface in the LTE and LET-Advanced system so as to better support the handover of the UE.

The method of managing the X2 interface according to an embodiment of the invention includes:

finding by a first eNB, a new neighboring cell, which is a second cell corresponding to a second HeNB;

determining by the first eNB, an access mode of the second cell; and establishing a first X2 interface between the first eNB and the second HeNB when the access mode of the second cell is an open mode or a hybrid mode.

The above method will be described in detail with reference to FIG. 3.

Figure 3:
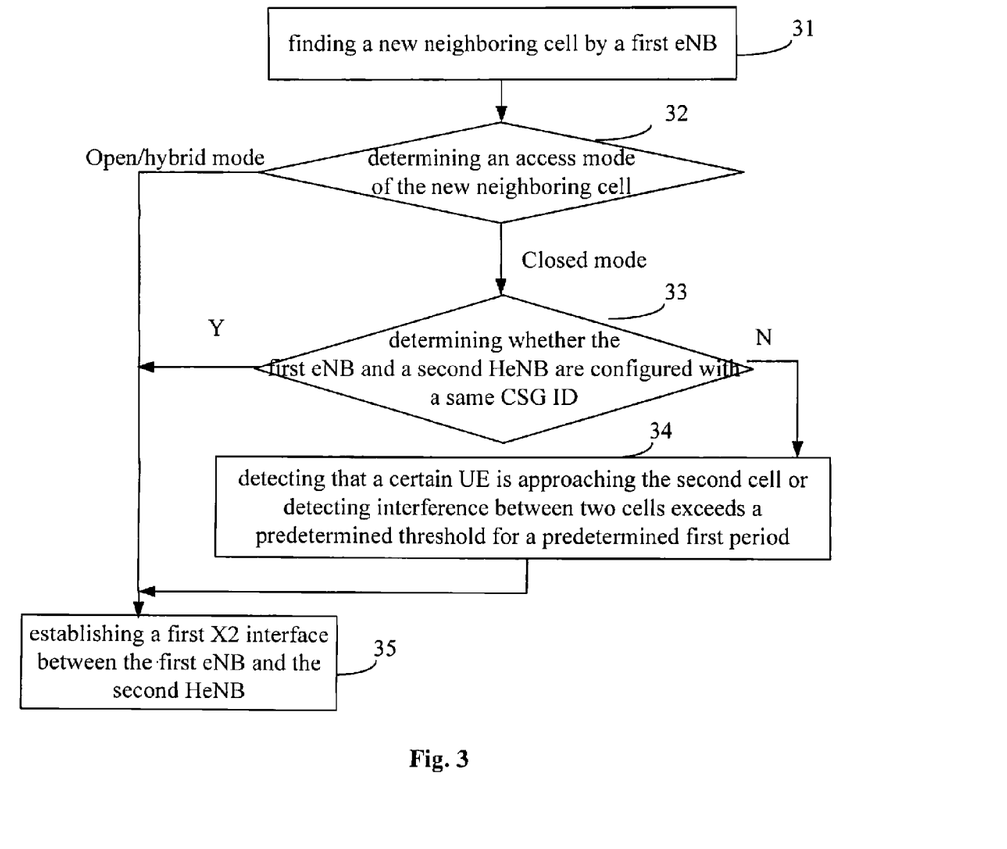
FIG. 3 is a flow chart showing a method of managing the X2 interface according to an embodiment of the invention.

As shown in FIG. 3, in establishing an X2 interface, a method of managing an X2 interface according to an embodiment of the invention includes the following steps.

Step S31, a first eNB finds a new neighboring cell, which is a second cell corresponding to a second HeNB.

Here, the first eNB may be a first macro eNB or a first HeNB. The first eNB may be configured with a plurality of cells and the new neighboring cell may be a neighboring cell of any cell of the first eNB. The first eNB finding the new neighboring cell means the first eNB detecting that the new neighboring cell is added to its neighboring cell list. Adding the new neighboring cell may includes the following steps: the first eNB receives a signal from the second HeNB with its downlink signal receiver or the first eNB obtains a signal parameter of the second HeNB from a measurement report from a UE; and when a quality of the signal from the second HeNB meets a predetermined requirement, the first eNB adds a second cell corresponding to the second HeNB to its neighboring cell list.

Step S32, the first eNB determines an access mode of the second cell. When the access mode of the second cell is a closed mode, the process proceeds to step S33; and when the access mode of the second cell is an open mode or a hybrid mode, the process proceeds to step S35.

Step S33, it is determined whether the first eNB and the second HeNB are configured with a same closed subscriber group identifier (CSG ID) when the access mode of the second cell is a closed mode. If yes, the process proceeds to step S35; otherwise, the process proceeds to step S34.

Here, the first eNB may obtain the CSG ID configured by the second HeNB from the signal received from the second HeNB or from the measurement report from the UE.

Step S34, when the first eNB and the second HeNB are not configured with the same CSG ID, the process proceeds to step S35 upon detecting that a certain UE is approaching the second cell or upon detecting that interference between the first cell corresponding to the first eNB and the second cell exceeds a predetermined threshold for a predetermined first period. The certain UE refers to a UE residing in a first cell corresponding to the first eNB and having access to the first cell and the second cell, approaching the second cell refers to there is a possibility that the certain UE enters the second cell within a predetermined period or a distance between the certain UE and a coverage border of the second cell is less than a predetermined distance. The predetermined first period is a predetermined period of time.

Detecting a certain UE approaching the second cell may include several occasions.

For example, a probability that the certain UE enters the second cell within the predetermined period is determined according to a current mobility state, a current location of the certain UE and a coverage of the cell. When the probability is larger than a predetermined value, it is determined that the certain UE is approaching the second cell. The current mobility state may be obtained from mobility state detection, and the current location may be obtained from GPS information or may be obtained from location detection of other cells.

For example, when a distance between the certain UE and a coverage border of the second cell is less than a predetermined distance, it is determined that the certain UE is approaching the second cell.

The method of detecting the interference between cells may be implemented by analyzing the measurement report from the UE or by using a downlink receiving device configured for the HeNB.

Step S35, the first eNB establishes a first X2 interface between the first eNB and the second HeNB and the process ends.

In step S35, the first X2 interface may be established by:

determining whether the second HeNB is connected with a mobility management entity through a HeNB gateway when the first eNB is a macro eNB, if yes, establishing a gateway proxied X2 interface between the first eNB and the second HeNB, and if no, establishing a direct X2 interface between the first eNB and the second HeNB; or determining whether the first eNB and the second HeNB are connected with a same mobility management entity (MME) or a same HeNB gateway when the first eNB is a HeNB, if yes, establishing a direct X2 interface between the first eNB and the second HeNB, and if no, establishing a gateway proxied X2 interface between the first eNB and the second HeNB.

Figure 4:
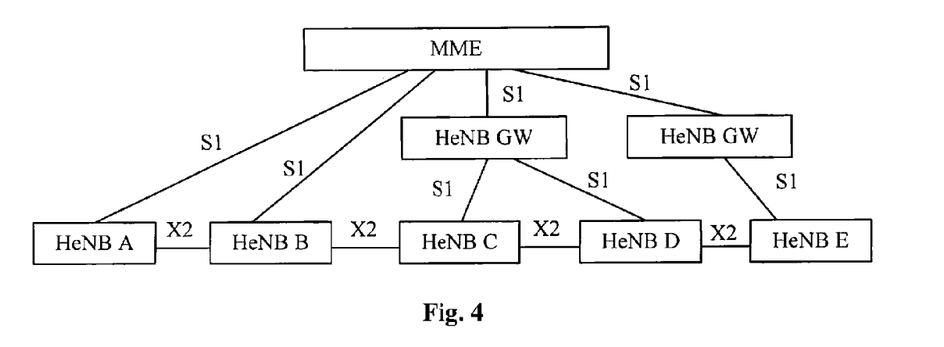
FIG. 4 is a flow chart showing a method of establishing the X2 interface between HeNBs according to an embodiment of the invention.
Figure 5:
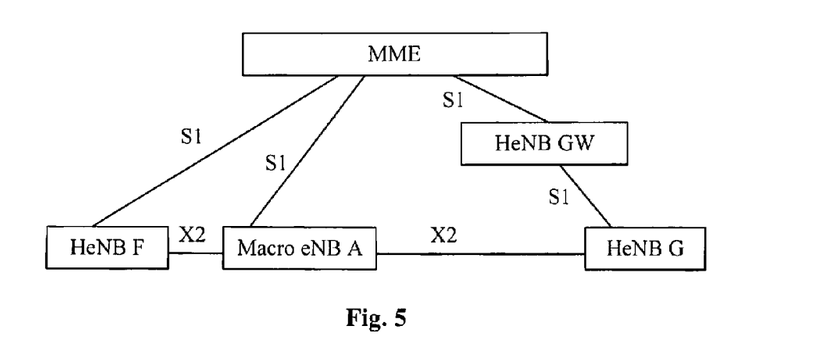
FIG. 5 is a flow chart showing a method of establishing the X2 interface between a macro eNB and a HeNB according to an embodiment of the invention.

Step S35 provides a principle for choosing a way for establishing the X2 interface. If the HeNB GW exists between the macro eNB and the MME, the gateway proxied X2 interface is used as the X2 interface between the macro eNB and the HeNB; otherwise the direct X2 interface is used. If two HeNBs are connected to the same MME or the same HeNB GW, the direct X2 interface is used as the X2 interface between the two HeNBs; otherwise the gateway proxied X2 interface is used. As shown in FIG. 4 and FIG. 5, the direct X2 interface is established between the HeNB A and the HeNB B. Similarly, the direct X2 interface is established between the HeNB C and the HeNB D and between the macro eNB A and the HeNB F. The gateway proxied X2 interface is established between the HeNB B and the HeNB C, and between the HeNB D and the HeNB E, and between the macro eNB A and the HeNB G.

It can be seen from the above method of managing the X2 interface that the X2 interface is established by steps of:

determining by the first eNB whether a condition for establishing the first X2 interface is satisfied; and if yes, the first X2 interface between the first eNB and the second HeNB is established.

The condition for establishing the first X2 interface includes at least one of the following conditions:

the first eNB finds a new neighboring cell, in which the new neighboring cell is a second cell corresponding to the second HeNB and the access mode of the new neighboring cell is the open mode or the hybrid mode;

the first eNB finds the new neighboring cell, in which the access mode of the new neighboring cell is the closed mode but the first eNB and the second HeNB are configured with a same CSG ID;

the first eNB and the second HeNB are not configured with a same CSG ID, but it is detected that a certain UE is approaching the second cell or that interference between a first cell corresponding to the first eNB and the second cell exceeds a predetermined threshold for a predetermined first period, in which the certain UE refers to a UE residing in the first cell corresponding to the first eNB and having access to the first cell and the second cell; and there is no X2 interface established between the first eNB and the second HeNB and it is determined whether a handover frequency between the first eNB and the second HeNB through the S1 interface exceeds a first predetermined threshold.

If the interference between the first cell corresponding to the first eNB and the second cell exceeds a predetermined threshold for a first predetermined period, the first X2 interface is for transmitting interference coordination information between cells in order to realize interference coordination processing between the cells, in which the interference coordination information includes an overload indication (OI), a high interference indication (HII) etc. If the eNB supports carrier aggregation, the interference coordination information may further include a corresponding carrier ID etc.

From the above, the method of managing the X2 interface according to an embodiment of the invention may trigger establishing the X2 interface according to different scenarios and may select an appropriate way to establish the X2 interface (for example, the direct X2 interface or the gateway proxied X2 interface) according to a specific scenario. With the gateway proxied X2 interface, the number of the X2 interfaces may be reduced so that resource consumption may be reduced; with the direct X2 interface, the transfer item information maintained on the HeNB may be reduced. According to the embodiment of the invention, the expansible problem and the system overhead due to the X2 interface in the LTE or the LET-Advance system may be effectively reduced so as to better support the handover.

After the first X2 interface is established, it may be dynamically released according to changes of an actual scenario according to an embodiment of the invention. Therefore, the method of managing the X2 interface may include the following steps after establishing the first X2 interface.

Step S36, determining by the first eNB whether a condition for releasing the first X2 interface is satisfied, in which the first X2 interface is between the first eNB and the second HeNB.

Step S37, if yes, releasing the first X2 interface between the first eNB and the second HeNB.

The condition for releasing the first X2 interface includes at least one of the following conditions:

1) The second cell corresponding to the second HeNB has been deleted from the neighboring cells of the first eNB. For example, if the second HeNB is closed or its power is reduced, which leads to a deletion of the second cell from the neighboring cell list of the first eNB, there will be no switch between the first eNB and the second HeNB and therefore the X2 interface may be released.

2) It is detected that all the certain UEs have left the second cell. The certain UE refers to a UE residing in a first cell corresponding to the first eNB and having access to the first cell and the second cell. When there is no certain UE, there will be no switch between the first cell and the second cell and therefore the X2 interface may be released.

3) A handover frequency between the first eNB and the second HeNB through the X2 interface is lower than a predetermined second threshold. The handover frequency may be calculated by the MME or an OAM node, which is a number of handover times within a time unit. When the handover frequency of the X2 interface is low, the S1 interface may meets the handover requirement and the X2 interface does not need to be maintained and therefore may be deleted.

4) interference between the first cell and the second cell does not exceed the predetermined threshold for a predetermined second period. The predetermined second period is another predetermined period and may be the same or different from the predetermined first period.

In the embodiment, the releasing methods may be different for different types of first X2 interfaces.

When the first X2 interface is a direct X2 interface, releasing the first X2 interface between the first eNB and the second HeNB includes releasing a context of the first X2 interface at the first eNB and the second HeNB respectively.

When the first X2 interface is a gateway proxied X2 interface, releasing the first X2 interface between the first eNB and the second HeNB includes releasing a context of a first segment and releasing a context related to the first X2 interface in a second segment, wherein the first segment is a segment of the first X2 interface between the second HeNB and a HeNB gateway and the second segment is a segment of the first X2 interface between the first eNB and the HeNB gateway.

According to the above steps, the X2 interface may be released dynamically according to changes of scenarios.

According to the method of managing the X2 interface, the X2 interface may be released based on handover statistics. In addition, the X2 interface may be established based on handover statistics. For example, when an X2 interface is not established between the first eNB and the second HeNB, the first eNB determines whether a handover frequency between the first eNB and the second HeNB through an S1 interface is higher than a first threshold; if yes, the first eNB establishes the X2 interface between the first eNB and the second HeNB to share the handover so as to reduce a load on the core network because of the handover of the S1 interface.

Figure 6:
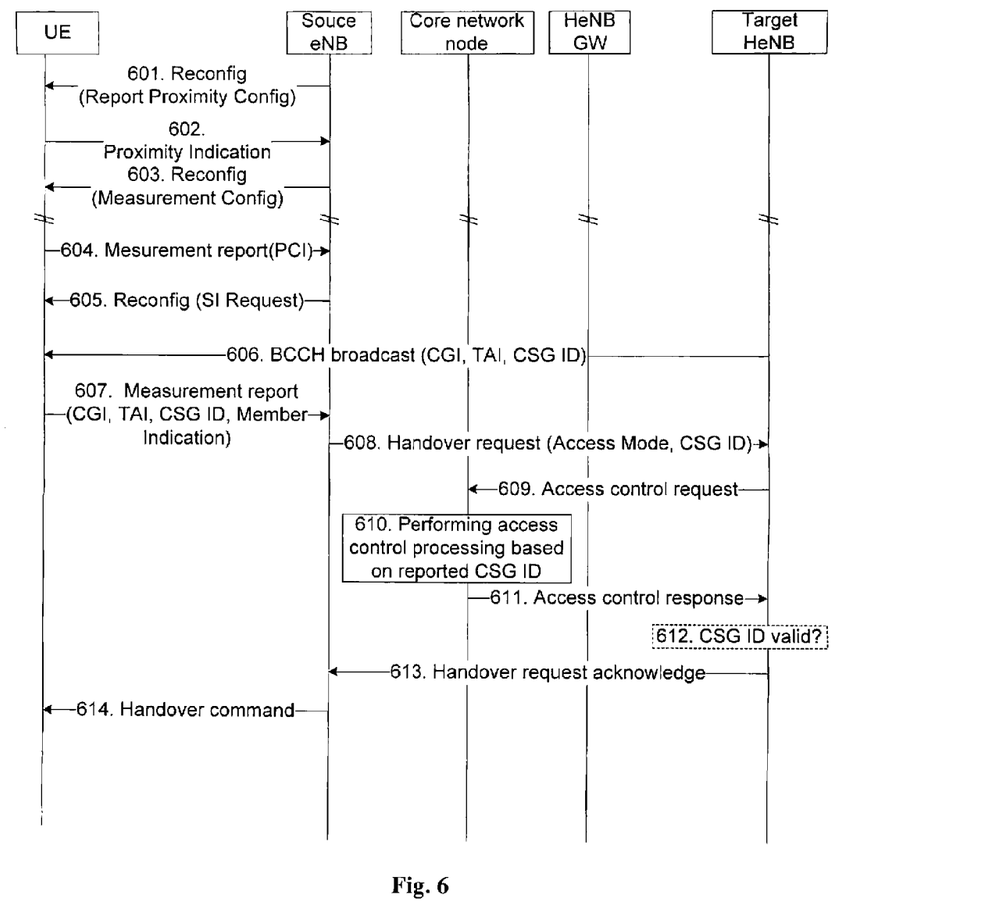
FIG. 6 is a schematic diagram showing a handover procedure according to an embodiment of the invention.

An embodiment of the invention further provides a method of handover from the first eNB (source eNB, which may be a macro eNB or a HeNB) to the second HeNB (target HeNB). The method is used for the first X2 interface established above. As shown in FIG. 6, the handover method may include the following steps.

Step S601-S606, the UE obtains cell parameters of the source eNB and the target HeNB according to its measurement mechanism, which may be the same with conventional technologies.

Step S607, the UE sends the measurement report to the source eNB, in which the measurement report includes Cell Global Identifier (CGI), Tracking Area Identifier (TAI), CSG ID and member indication etc.

Step S608, the source eNB receives the measurement report from the UE and sends a handover request to the target HeNB through the first X2 interface when a signal quality between the source eNB and the target HeNB meets a predetermined requirement so as to request to switch the UE to the target HeNB. The handover request carries UE information, an access mode of the target HeNB reported by the UE and CSG ID etc.

Step S609, when the target HeNB receives the handover request, it sends an access control request to a core network node (such as the MME or the HeNB GW) to request whether the UE may access the target HeNB. The access control request also carries the UE information, the access mode of the target HeNB reported by the UE and the CSG ID etc.

Step S610, the core network node performs an access control processing for the handover of the UE to determine whether the UE may access the target HeNB based on contract information of the UE and the CSG ID of the target HeNB etc. carried in the access control request.

Step S611, when the UE may access the target HeNB, the core network node returns an access control response to the target HeNB to indicate that the UE may access the target HeNB.

Step S612, after the target HeNB receives the access control response, it performs an ID authentication on the UE to determine whether CSG ID of the target HeNB reported by the UE is its own CSG ID.

Step S613, when the CSG ID of the target HeNB reported by the UE is its own CSG ID, the target HeNB returns a handover request confirmation to the source eNB through the first X2 interface to indicate that the UE is allowed to be handed over to the target HeNB.

Step S614, when the source eNB receives the handover request confirmation, it sends a handover command to the UE to indicate the UE to switch to the target HeNB. The subsequent handover flow is the same with conventional technologies and will not be described in detail here.

The above step S612 is optional. The target HeNB may directly proceed to step S613 after receiving the access control response in step S611, to return the handover request confirmation to the source eNB through the first X2 interface to indicate that the UE is allowed to be handed over to the target HeNB.

Figure 7:
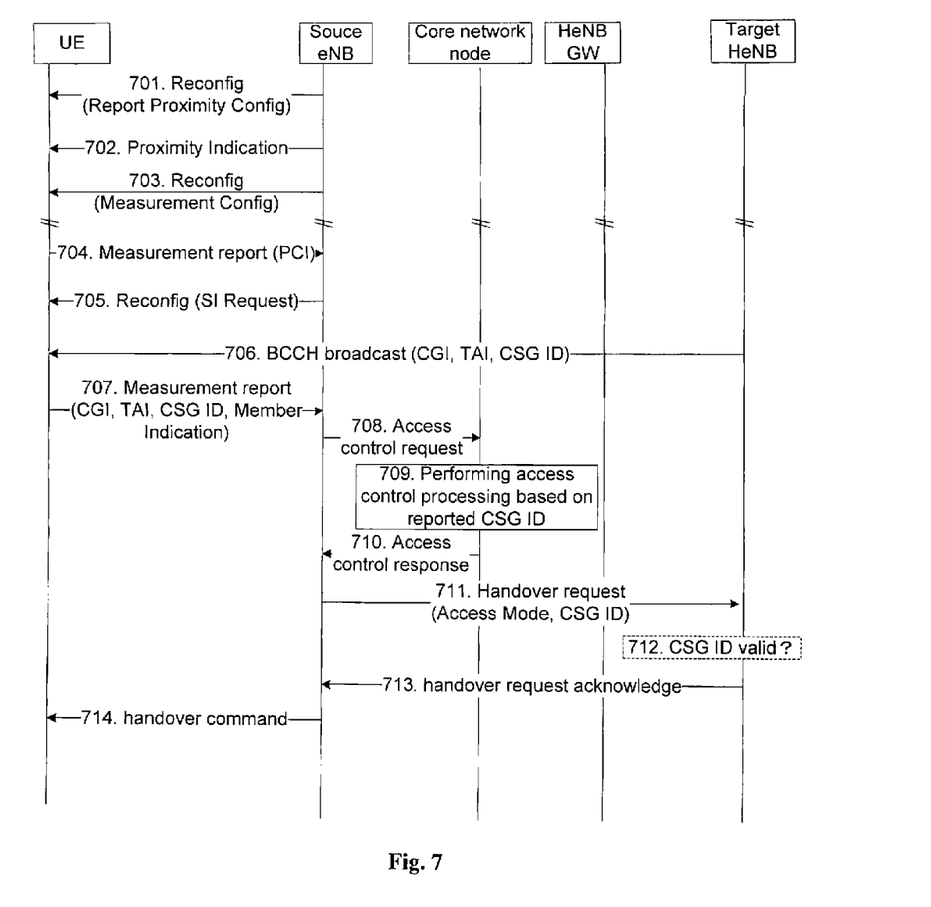
FIG. 7 is a schematic diagram showing another handover procedure according to an embodiment of the invention.

An embodiment of the invention further provides another handover method, used in the first X2 interface established above. As shown in FIG. 7, the handover method may include the following steps.

Step S701-S706, the UE obtains cell parameters of the source eNB and the target HeNb according to the measurement mechanism, which may be the same with conventional technologies.

Step S707, the UE sends the measurement report to the source eNB, in which the measurement report includes Cell Global Identifier (CGI), Tracking Area Identifier (TAI), CSG ID and member indication etc.

Step S708, the source eNB receives the measurement report from the UE and sends an access control request to a core network node (such as the MME or the HeNB GW) to request whether the UE may access the target HeNB. The access control request carries UE information, an access mode of the target HeNB reported by the UE and CSG ID etc.

Step S709, the core network node performs an access control processing for the handover of the UE to determine whether the UE may access the target HeNB based on contract information of the UE and the CSG ID of the target HeNB etc. carried in the access control request.

Step S710, when the UE may access the target HeNB, the core network node returns an access control response to the source eNB to indicate that the UE may access the target HeNB.

Step S711, when the source eNB receives the access control response, it sends a handover request to the target HeNB through the first X2 interface so as to request to switch the UE to the target HeNB. The handover request carries UE information, an access mode of the target HeNB reported by the UE and CSG ID etc.

Step S712, after the target HeNB receives the access control response, it performs an ID authentication on the UE to determine whether CSG ID of the target HeNB reported by the UE is its own CSG ID.

Step S713, when the CSG ID of the target HeNB reported by the UE is its own CSG ID, the target HeNB returns a handover request confirmation to the source eNB through the first X2 interface to indicate that the UE is allowed to be handed over to the target HeNB.

Step S714, when the source eNB receives the handover request confirmation, it sends a handover command to the UE to indicate the UE to switch to the target HeNB. The subsequent handover flow is the same with conventional technologies and will not be described in detail here.

The above step S712 is optional. The target HeNB may directly proceed to step S713 after receiving the handover request in step S711, to return a handover request confirmation to the source eNB to indicate that the UE is allowed to be handed over to the target HeNB.

In the flow shown in FIG. 7, the source eNB first initiates an access control request to determine whether the UE may access the target HeNB. Therefore, if the UE may not access the target HeNB, it will not send a handover request to the target HeNB, thus reducing unnecessary signaling transmission overhead.

An embodiment of the invention provides interference coordination method, the interference coordination method includes the steps of:

finding by a first eNB□ a new neighboring cell, which is a second cell corresponding to a second HeNB;

determining an access mode of the second cell by the first eNB;

determining whether the first eNB and the second HeNB are configured with a same closed subscriber group identifier when the access mode of the second cell is a closed mode;

if no, establishing a first X2 interface between the first eNB and the second HeNB upon detecting that interference between a first cell corresponding to the first eNB and the second cell exceeds a predetermined threshold for a predetermined first period; and transmitting interference coordination information between cells through the first X2 interface and performing interference coordination based on the interference coordination information.

In the above steps, the interference coordination information includes carrier frequency points, frequency marks, overload indications (OIs), high interference indications (Ms) of different carriers etc.

In an embodiment of the invention, in consideration of bandwidth of the first X2 interface, the interference coordination method further includes the steps of: checking an available bandwidth of the first X2 interface; and adjusting an interacting frequency of the interference coordination information dynamically based on the available bandwidth. For example, the more the available bandwidth of the first X2 interface, the higher the interacting frequency is; in contrary, the less the available bandwidth of the first X2 interface, the lower the interacting frequency is.

The conventional interference coordination solution based on the X2 interface for eNB is not suitable for the HeNB. Firstly, there is no solution for establishing the X2 interface between the HeNB and the eNB or between the HeNBs according to interference. Secondly, since the X2 interface of the HeNB may be established on a physical link (such as narrow band Ethernet or xDSL link) with a limited bandwidth, there is no solution for reducing overhead of interference coordination message.

According to the methods of the embodiments of the invention, specific solutions are proposed to solve defects of conventional technologies. According to the methods of the embodiments of the invention, the X2 interface may be established according to the interference, the interacting frequency of the interference coordination information may be controlled according to the bandwidth and the transmitting frequency of the interference control message may be adjusted so as to ensure that the X2 interface will not be overloaded because of the interference coordination; when there is a high bandwidth link (such as optical network or wide band Ethernet) between the first eNB and the second HeNB, the interference coordination message may be interacted with a high frequency so as to better coordination the interference.

In summary, according to the method of managing the X2 interface according to the embodiment of the invention, the X2 interface may be established and released dynamically and the mode for establishing the X2 interface may be selected according to a specific scenario. The expansible problem and a system overhead due to the X2 interface in the LTE and LTE-Advanced system may be reduced effectively so as to better support the handover.

Figure 8:
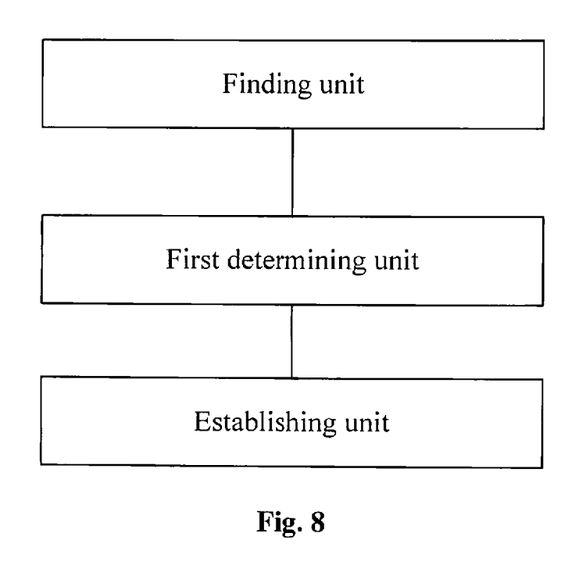
FIG. 8 is a block diagram showing a configuration of an apparatus managing the X2 interface.

Based on the above methods, an embodiment of the invention provides a first eNB. As shown in FIG. 8, the first eNB includes:

a finding unit, configured to find a new neighboring cell of the first eNB, which is a second cell corresponding to a second HeNB;

a first determining unit, configured to determine an access mode of the second cell; and a establishing unit, configured to establish a first X2 interface between the first eNB and the second HeNB when the access mode of the second cell is an open mode or a hybrid mode.

In a preferred embodiment, the first eNB further includes: a second determining unit, configured to determine whether the first eNB and the second HeNB are configured with a same closed subscriber group identifier when the access mode of the second cell is a closed mode, wherein the establishing unit is further configured to establish the first X2 interface between the first eNB and the second HeNB when the first eNB and the second HeNB are configured with the same closed subscriber group identifier.

In a preferred embodiment, the first eNB further includes: a first detecting unit, configured to detect whether a certain UE is approaching the second cell, wherein the certain UE refers to a UE residing in a first cell corresponding to the first eNB and having access to the first cell and the new neighbor cell, approaching the second cell refers to there is a possibility that the certain UE enters the second cell within a predetermined period or a distance between the certain UE and a coverage border of the second cell is less than a predetermined distance, wherein the establishing unit is further configured to establish the first X2 interface between the first eNB and the second HeNB if the first detecting unit detects that the certain UE is approaching the new neighbor cell when the first eNB and the second HeNB are not configured with the same closed subscriber group identifier.

In a preferred embodiment, the first eNB further includes: a second detecting unit, configured to detect interference between the first cell corresponding to the first eNB and the second cell and to detect whether the interference exceeds a predetermined threshold for a predetermined first period, wherein the establishing unit is further configured to establish the first X2 interface between the first eNB and the second HeNB if the second detecting unit detects the interference exceeds the predetermined threshold for the predetermined first period when the first eNB and the second HeNB are not configured with the same closed subscriber group identifier.

In a preferred embodiment, the establishing unit includes: a first processing unit, configured to determine whether the second HeNB is connected with a mobility management entity through a HeNB gateway when the first eNB is a macro eNB, if yes, to establish a gateway proxied X2 interface between the first eNB and the second HeNB, and if no, to establish a direct X2 interface between the first eNB and the second HeNB: and a second processing unit, configured to determine whether the first eNB and the second HeNB are connected with a same mobility management entity or a same HeNB gateway when the first eNB is a HeNB, if yes, to establish a direct X2 interface between the first eNB and the second HeNB, and if no, to establish a gateway proxied X2 interface between the first eNB and the second HeNB.

In a preferred embodiment, the first eNB further includes: a third determining unit, configured to determine whether a condition for releasing the first X2 interface is satisfied, wherein the first X2 interface is established between the first eNB and the second HeNB; and a releasing unit, configured to release the first X2 interface between the first eNB and the second HeNB when the third determining unit determines that the condition for releasing the first X2 interface is satisfied, wherein the condition for releasing the first X2 interface includes at least one of the following conditions: the second cell corresponding to the second HeNB has been deleted from the neighboring cells of the first eNB; it is detected that all the certain UEs have left the second cell; a handover frequency between the first eNB and the second HeNB through the X2 interface is lower than a predetermined second threshold; and interference between the first cell and the second cell does not exceed the predetermined threshold for a predetermined second period.

In a preferred embodiment, the releasing unit includes: a third processing unit, configured to release a context of the first X2 interface at the first eNB and the second HeNB respectively when the first X2 interface is a direct X2 interface; and a fourth processing unit, configured to release a context of a first segment and a context related to the first X2 interface in a second segment when the first X2 interface is a gateway proxied X2 interface, wherein the first segment is a segment of the first X2 interface between the second HeNB and a HeNB gateway and the second segment is a segment of the first X2 interface between the first eNB and the HeNB gateway.

In a preferred embodiment, the first eNB further includes: a fourth determining unit, configured to determine whether a handover frequency through an S1 interface between the first eNB and the second HeNB is higher than a predetermined first threshold when the S1 interface is established between the first eNB and the second HeNB and an X2 interface is not established, wherein the establishing unit is further configured to establish the first X2 interface between the first eNB and the second HeNB when the handover frequency through an S1 interface is higher than the predetermined first threshold.

An embodiment of the invention provides a system for handing over a UE, the system includes the first eNB, the second HeNB and the mobility management entity, and the first X2 interface established between the first eNB and the second HeNB, wherein the first eNB is a source eNB and sends a handover request for a UE to the second HeNB, the second HeNB sends an access control request to the mobility management entity after receiving the handover request; the mobility management entity returns an access control response to the second HeNB based on contract information of the UE; the second HeNB returns a handover request response indicating whether the UE is allowed to be handed over to the first eNB through the first X2 interface based on the access control response; and when the handover request response indicating that the UE is allowed to be handed over, the first eNB sends a handover command to the UE so as to control the UE to be handed over to a cell corresponding to the second HeNB.

An embodiment of the invention provides a system for handing over a UE, the system includes the first eNB, the second HeNB and a core network node (for example, a mobility management entity or a HeNB gateway), and the first X2 interface is established between the first eNB and the second HeNB, wherein the first eNB is a source eNB and sends an access control request for a UE to the core network node (for example, the mobility management entity or the HeNB gateway), wherein the access control request is for requesting the UE to be handed over from a first cell corresponding to the first eNB to a cell corresponding to the second HeNB; the core network node returns an access control response to the first eNB based on contract information of the UE; if the access control response indicates that the UE is allowed to be handed over, the first eNB sends a handover request for the UE to the second HeNB through the first X2 interface; the second HeNB returns a switch response indicating that the UE is allowed to be handed over to the first eNB after receiving the handover request; and the first eNB sends a handover command to the UE to control the UE to be handed over to the cell corresponding to the second HeNB after receiving the handover request acknowledge.

An embodiment of the invention provides a system for interference coordination, the system includes the first eNB, the second HeNB and the core network node, the first X2 interface is established between the first eNB and the second HeNB, wherein interference coordination information between the first eNB and the second HeNB is transmitted through the first X2 interface and interference coordination is performed based on the interference coordination information.

Although explanatory embodiments of the methods, apparatus and system have been shown and described, it would be appreciated by those skilled in the art that any change, alternative, and modification falling into the scope of the claims and their equivalents may be made in the embodiments without departing from spirit and principles of the disclosure.

What is claimed is:
1. A method of managing an X2 interface, comprising:
finding by a first eNB, a new neighboring cell, which is a second cell corresponding to a second HeNB;
determining by the first eNB, an access mode of the second cell; and
establishing a first X2 interface between the first eNB and the second HeNB when the access mode of the second cell is an open mode or a hybrid mode;
wherein establishing the first X2 interface between the first eNB and the second HeNB comprises:
determining whether the second HeNB is connected with a mobility management entity through a HeNB gateway when the first eNB is a macro eNB, if yes, establishing a gateway proxied X2 interface between the first eNB and the second HeNB, and if no, establishing a direct X2 interface between the first eNB and the second HeNB; and
determining whether the first eNB and the second HeNB are connected with a same mobility management entity or a same HeNB gateway when the first eNB is a HeNB, if yes, establishing a direct X2 interface between the first eNB and the second HeNB, and if no, establishing a gateway proxied X2 interface between the first eNB and the second HeNB;
checking an available bandwidth of the first X2 interface; and
adjusting an interacting frequency of the interference coordination information dynamically based on the available bandwidth.

2. The method according to claim 1, further comprising:
determining whether the first eNB and the second HeNB are configured with a same closed subscriber group identifier when the access mode of the second cell is a closed mode; and
establishing the first X2 interface between the first eNB and the second HeNB when the first eNB and the second HeNB are configured with the same closed subscriber group identifier.

3. The method according to claim 2, further comprising:
establishing the first X2 interface between the first eNB and the second HeNB upon detecting that a certain user equipment is approaching the second cell when the first eNB and the second HeNB are not configured with the same closed subscriber group identifier, wherein the certain user equipment refers to a user equipment residing in a first cell corresponding to the first eNB and having access to the first cell and the second cell, approaching the second cell refers to there is a possibility that the certain user equipment enters the second cell within a predetermined period or a distance between the certain user equipment and a coverage border of the second cell is less than a predetermined distance.

4. The method according to claim 2, further comprising:
establishing the first X2 interface between the first eNB and the second HeNB upon detecting that interference between the first cell corresponding to the first eNB and the second cell exceeds a predetermined threshold for a predetermined first period when the first eNB and the second HeNB are not configured with the same closed subscriber group identifier, wherein the first X2 interface is configured to transmit interference coordination information between cells.

5. The method according to claim 1, further comprising:
determining by the first eNB whether a condition for releasing the first X2 interface is satisfied, and if yes, releasing the first X2 interface between the first eNB and the second HeNB,
wherein the condition for releasing the first X2 interface comprises at least one of the following conditions:
the second cell corresponding to the second HeNB has been deleted from neighboring cells of the first eNB;
it is detected that all the certain user equipments have left the second cell;
a handover frequency between the first eNB and the second HeNB through the X2 interface is lower than a predetermined second threshold; and
interference between the first eNB and the second HeNB does not exceed the predetermined threshold for a predetermined second period.

6. The method according to claim 5, wherein
when the first X2 interface is a direct X2 interface, releasing the first X2 interface between the first eNB and the second HeNB comprises releasing a context of the first X2 interface at the first eNB and the second HeNB respectively; and
when the first X2 interface is a gateway proxied X2 interface, releasing the first X2 interface between the first eNB and the second HeNB comprises releasing a context of a first segment and releasing a context related to the first X2 interface in a second segment, wherein the first segment is a segment of the first X2 interface between the second HeNB and a HeNB gateway and the second segment is a segment of the first X2 interface between the first eNB and the HeNB gateway.

7. The method according to claim 5, further comprising:
determining whether a handover frequency between the first eNB and the second HeNB through an S1 interface is higher than a predetermined first threshold when an X2 interface is not established between the first eNB and the second HeNB; and
if yes, establishing the first X2 interface between the first eNB and the second HeNB.

8. A handover method used in the first X2 interface established according to claim 1, comprising:
sending a handover request for a user equipment to a second HeNB from a first eNB, wherein the first eNB is a source eNB and the second HeNB is a target eNB;
sending an access control request to a core network node by the second HeNB after the second HeNB receives the handover request;
returning an access control response to the second HeNB by the core network node based on contract information of the user equipment;
returning a handover request acknowledge indicating whether the user equipment is allowed to be handed over to the first eNB through the first X2 interface based on the access control response by the second HeNB; and sending a handover command to the user equipment by the first eNB so as to control the user equipment to be handed over to a cell corresponding to the second HeNB when the handover request acknowledge indicates that the user equipment is allowed to be handed over.

9. A handover method used in the first X2 interface established according to claim 1, comprising:
sending an access control request for a user equipment to a core network node by a first eNB, wherein the first eNB is a source eNB and the access control request is for requesting the user equipment to be handed over from a first cell corresponding to the first eNB to a second cell corresponding to the second HeNB;
returning an access control response to the first eNB by the core network node based on contract information of the user equipment;
sending a handover request for the user equipment to the second HeNB through the first X2 interface from the first eNB if the access control response indicates that the user equipment is allowed to be handed over;
returning a switch response indicating that the user equipment is allowed to be handed over to the first eNB by the second HeNB through the first X2 interface after the second HeNB receives the handover request; and
sending a handover command to the user equipment by the first eNB to control the user equipment to be handed over to a cell corresponding to the second HeNB after the first eNB receives the handover request acknowledge.

10. An interference coordination method, comprising:
finding by a first eNB, a new neighboring cell, which is a second cell corresponding to a second HeNB;
determining by the first eNB, an access mode of the second cell;
determining whether the first eNB and the second HeNB are configured with a same closed subscriber group identifier when the access mode of the second cell is a closed mode;
if no, establishing a first X2 interface between the first eNB and the second HeNB upon detecting that interference between a first cell corresponding to the first eNB and the second cell exceeds a predetermined threshold for a predetermined first period;
transmitting interference coordination information between cells through the first X2 interface and performing interference coordination based on the interference coordination information; and
checking an available bandwidth of the first X2 interface; and
adjusting an interacting frequency of the interference coordination information dynamically based on the available bandwidth.

11. The interference coordination method according to claim 10, wherein the interference coordination information comprises carrier frequency points, overload indications and high interference indications of different carriers.

12. A first eNB, comprising:
a finding unit, configured to find a new neighboring cell of the first eNB, wherein the new neighboring cell is a second cell corresponding to a second HeNB;
a first determining unit, configured to determine an access mode of the second cell;
an establishing unit, configured to establish a first X2 interface between the first eNB and the second HeNB when the access mode of the second cell is an open mode or a hybrid mode;
a second determining unit, configured to determine whether the first eNB and the second HeNB are configured with a same closed subscriber group identifier when the access mode of the second cell is a closed mode, wherein the establishing unit is further configured to establish the first X2 interface between the first eNB and the second HeNB when the first eNB and the second HeNB are configured with the same closed subscriber group identifier;

a first detecting unit, configured to detect whether a certain user equipment is approaching the second cell, wherein the certain user equipment refers to a user equipment residing in a first cell corresponding to the first eNB and having access to the first cell and the second cell, approaching the second cell refers to there is a possibility that the certain user equipment enters the second cell within a predetermined period or a distance between the certain user equipment and a coverage border of the second cell is less than a predetermined distance, wherein the establishing unit is further configured to establish the first X2 interface between the first eNB and the second HeNB if the first detecting unit detects the certain user equipment is approaching the second cell when the first eNB and the second HeNB are not configured with the same closed subscriber group identifier;

a second detecting unit, configured to detect interference between a first cell corresponding to the first eNB and the second cell and to determine whether the interference exceeds a predetermined threshold for a predetermined first period, wherein the establishing unit is further configured to establish the first X2 interface between the first eNB and the second HeNB if the second detecting unit detects the interference exceeds the predetermined threshold for the predetermined first period when the first eNB and the second HeNB are not configured with the same closed subscriber group identifier;

checking an available bandwidth of the first X2 interface; and adjusting an interacting frequency of the interference coordination information dynamically based on the available bandwidth.

13. The first eNB according to claim 12, wherein the establishing unit comprises:

a first processing unit, configured to determine whether the second HeNB is connected with a mobility management entity through a HeNB gateway when the first eNB is a macro eNB, if yes, to establish a gateway proxied X2 interface between the first eNB and the second HeNB, and if no, to establish a direct X2 interface between the first eNB and the second HeNB; and a second processing unit, configured to determine whether the first eNB and the second HeNB are connected with a same mobility management entity or a same HeNB gateway when the first eNB is a HeNB, if yes, to establish a direct X2 interface between the first eNB and the second HeNB, and if no, to establish a gateway proxied X2 interface between the first eNB and the second HeNB.

14. The first eNB according to claim 12, further comprising:

a third determining unit, configured to determine whether a condition for releasing the first X2 interface is satisfied, wherein the first X2 interface is established between the first eNB and the second HeNB; and a releasing unit, configured to release the first X2 interface between the first eNB and the second HeNB when the third determining unit determines that the condition for releasing the first X2 interface is satisfied, wherein the condition for releasing the first X2 interface comprises at least one of the following conditions:

the second cell corresponding to the second HeNB has been deleted from neighboring cells of the first eNB;

it is detected that all the certain user equipments have left the second cell;

a handover frequency between the first eNB and the second HeNB through the X2 interface is lower than a predetermined second threshold; and interference between the first eNB and the second HeNB does not exceed the predetermined threshold for a predetermined second period.

15. The first eNB according to claim 14, wherein the releasing unit comprises:

a third processing unit, configured to release a context of the first X2 interface at the first eNB and the second HeNB respectively when the first X2 interface is a direct X2 interface; and a fourth processing unit, configured to release a context of a first segment and releasing a context related to the first X2 interface in a second segment when the first X2 interface is a gateway proxied X2 interface, wherein the first segment is a segment of the first X2 interface between the second HeNB and a HeNB gateway and the second segment is a segment of the first X2 interface between the first eNB and the HeNB gateway.

16. The first eNB according to claim 14, further comprising:

a fourth determining unit, configured to determine whether a handover frequency between the first eNB and the second HeNB through an S1 interface is higher than a predetermined first threshold when an X2 interface is not established between the first eNB and the second HeNB, wherein the establishing unit is further configured to establish the first X2 interface between the first eNB and the second HeNB when the handover frequency through an S1 interface is higher than the predetermined first threshold.

17. A system for handing over a user equipment, the system comprises the first eNB according to claim 12, a second HeNB and a core network node, and a first X2 interface established between the first eNB and the second HeNB, wherein the first eNB sends a handover request for a user equipment to the second HeNB, wherein the first eNB is a source eNB and the second HeNB is a target eNB;

the second HeNB sends an access control request to the core network node after receiving the handover request;

the core network node returns an access control response to the second HeNB based on contract information of the user equipment;

the second HeNB returns a handover request acknowledge indicating whether the user equipment is allowed to be handed over to the first eNB through the first X2 interface based on the access control response; and when the handover request acknowledge indicating that the user equipment is allowed to be handed over, the first eNB sends a handover command to the user equipment so as to control the user equipment to be handed over to a cell corresponding to the second HeNB.

18. A system for handing over a user equipment, the system comprises the first eNB according to claim 12, a second HeNB and a core network node, and a first X2 interface established between the first eNB and the second HeNB, wherein the first eNB sends an access control request for a user equipment to the core network node, wherein the first eNB is a source eNB and the access control request is for requesting the user equipment to be handed over from a cell corresponding to the first eNB to a cell corresponding to the second HeNB;

the core network node returns an access control response to the first eNB based on contract information of the user equipment;

the first eNB sends a handover request for the user equipment to the second HeNB through the first X2 interface if the access control response indicates that the user equipment is allowed to be handed over;

the second HeNB returns a switch response indicating that the user equipment is allowed to be handed over to the first eNB through the first X2 interface after receiving the handover request; and the first eNB sends a handover command to the user equipment to control the user equipment to be handed over to the cell corresponding to the second HeNB after receiving the handover request acknowledge.

19. A system for interference coordination, the system comprises the first eNB according to claim 12, a second HeNB and a core network node and a first X2 interface established between the first eNB and the second HeNB, wherein the first eNB and the second HeNB transmit interference coordination information through the first X2 interface and perform interference coordination based on the interference coordination information.

* * * * *